Aug. 21, 1945.  E. HARDESTY  2,383,190
APPLICATION OF CERAMIC COLOR
Filed Aug. 30, 1941  3 Sheets-Sheet 1
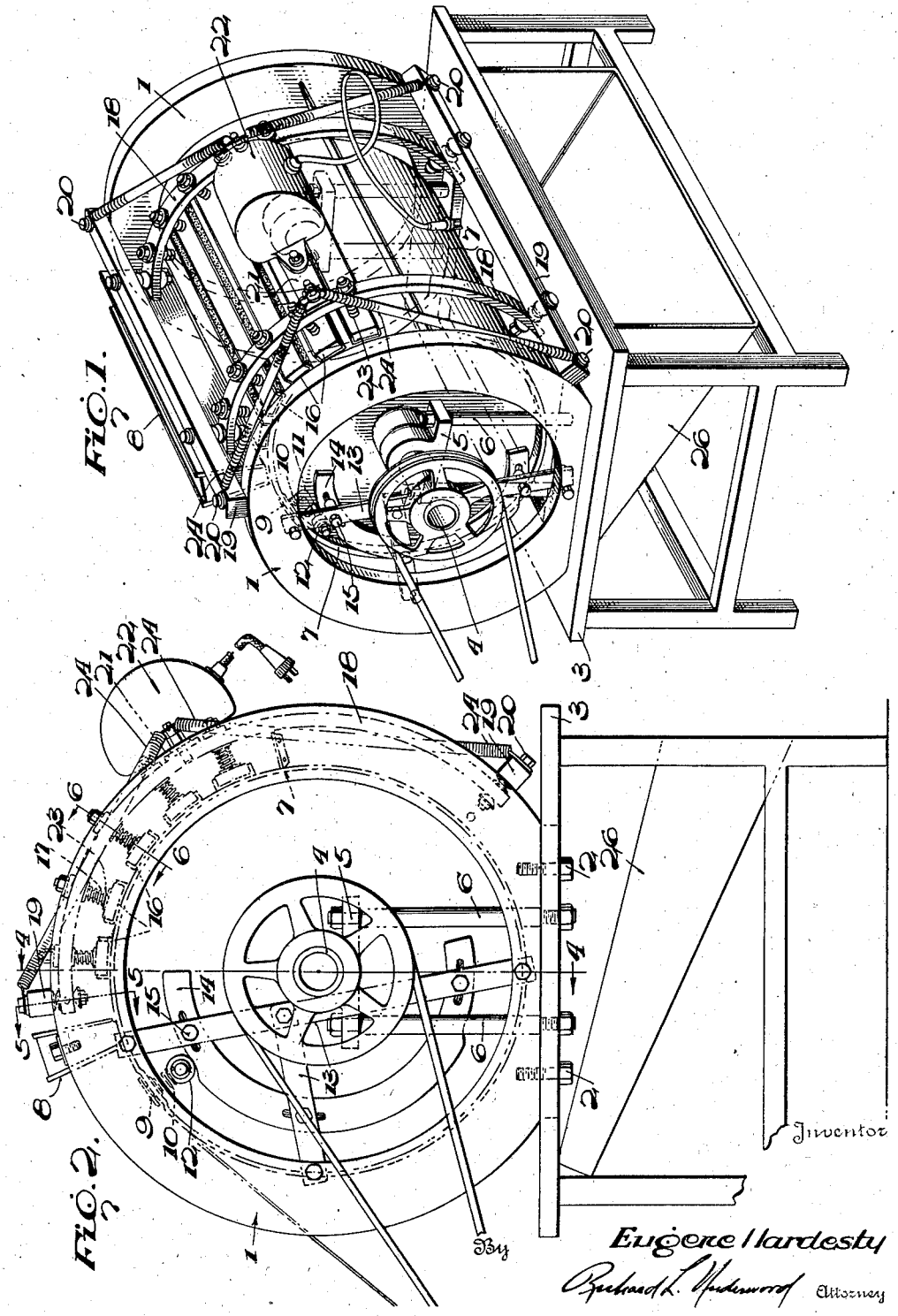
Inventor
Eugene Hardesty
Richard L. Underwood  Attorney Aug. 21, 1945.   E. HARDESTY   2,383,190
APPLICATION OF CERAMIC COLOR
Filed Aug. 30, 1941   3 Sheets-Sheet 2
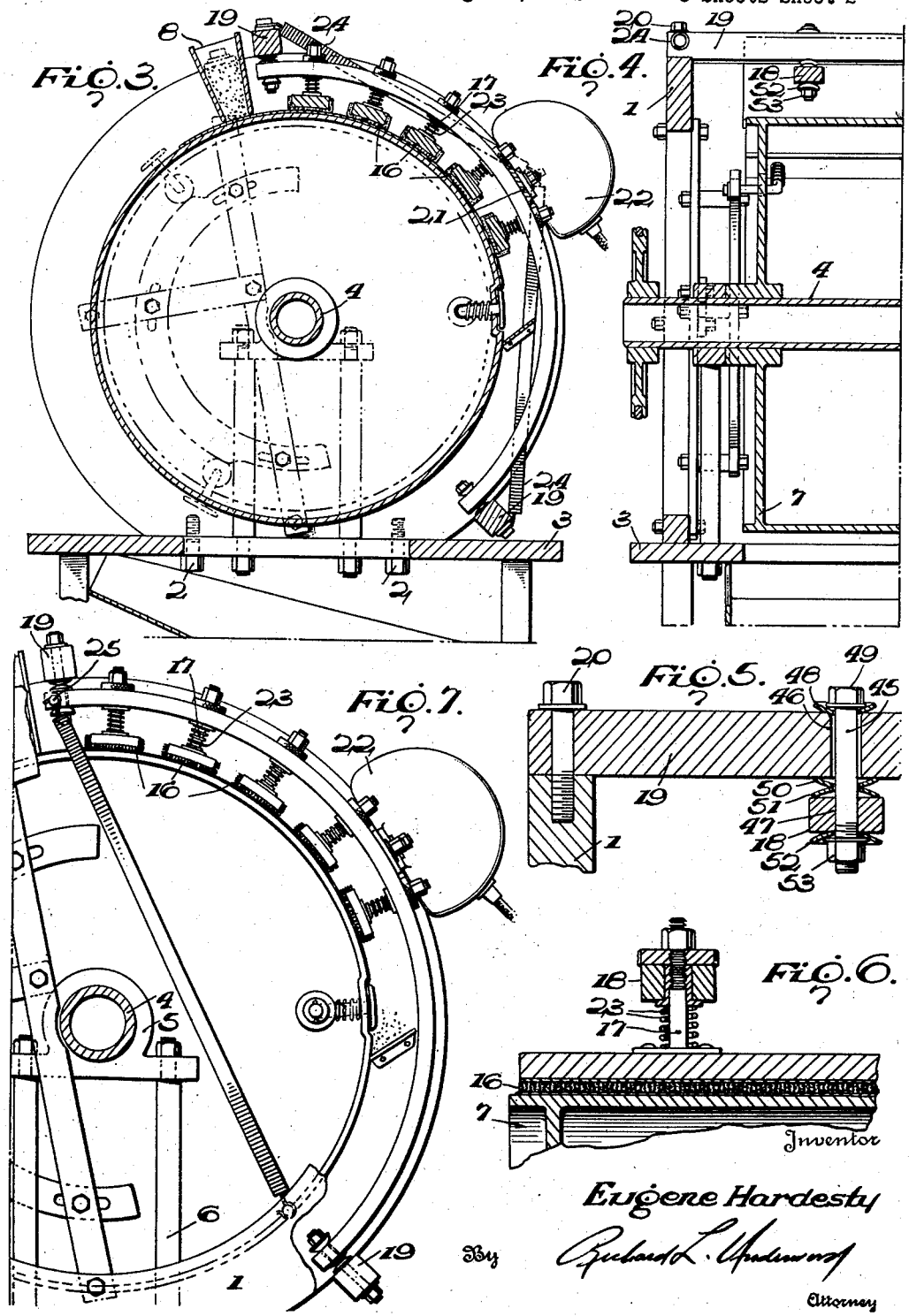
Inventor
Eugene Hardesty
By Richard L. Underwood
Attorney

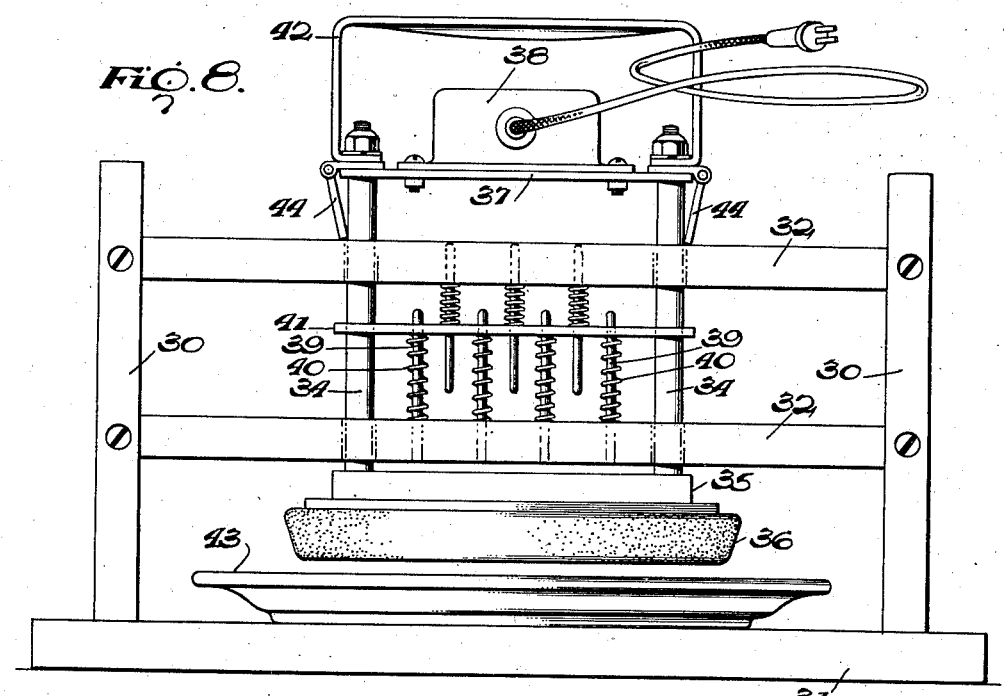
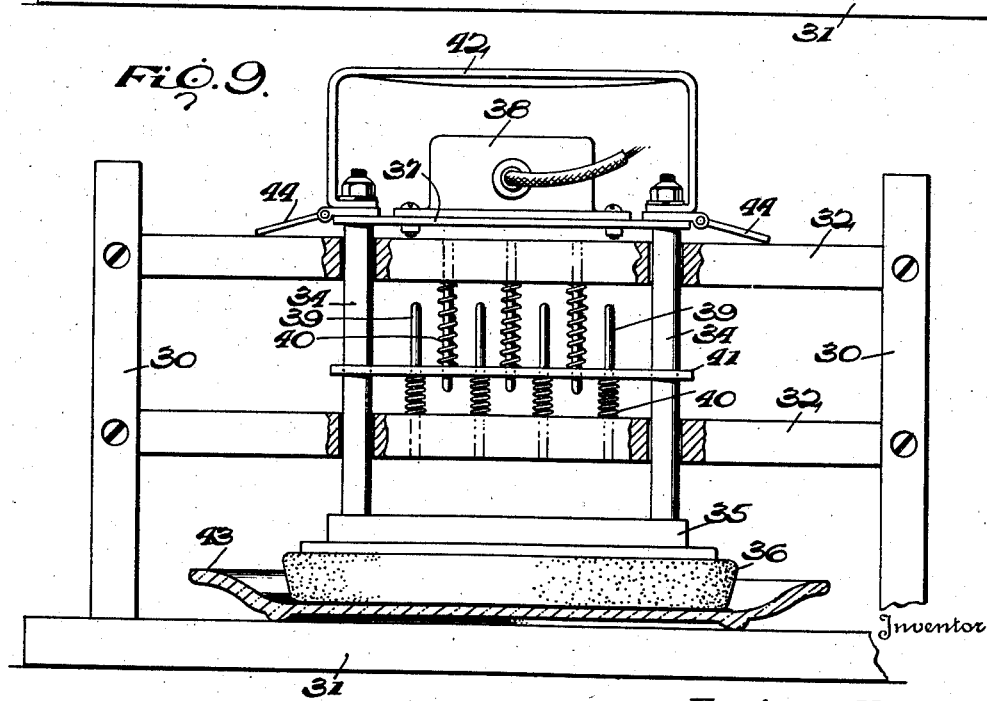

Patented Aug. 21, 1945

2,383,190

UNITED STATES PATENT OFFICE 2,383,190

APPLICATION OF CERAMIC COLOR

Eugene Hardesty, New Brighton, Pa., assignor to Fuller Label & Box Company, Pittsburgh, Pa., a corporation of Pennsylvania Application August 30, 1941, Serial No. 409,105

6 Claims. (Cl. 117—13)

My invention relates to the decoration of ceramic ware and related products of the ceramic industry, including articles made of glass, china, pottery, enamelware and the like. The invention contemplates a novel method by which color ornamentation, or analogues surface alteration, may be applied directly to the ware or indirectly to it by application first to some transfer medium such as decal paper or equivalent sheet material, or to a screen of silk, copper wire or the like.

Primary objects of the invention are to improve the quality of the decoration and to reduce the costs of the decorating operations.

In the best prior art methods known to me, it is customary to apply directly to the ware, or to an appropriate transfer sheet of any one of the types above indicated, a coating of some adhesive medium, such as decal varnish, dextrine gumming or the like, conforming exactly to the area intended to be colored. A suitable ceramic color or oxide, including some appropriate frit, is then dusted over the sheet or ware and is retained thereby in the coated areas only. The capacity of the coating to retain the applied dust is limited, and the results obtained upon subsequent firing have been unsatisfactory by reason of paleness and/or unequal distribution of the color. Attempts have been made to overcome this difficulty by rubbing or wiping the dust into the adhesive coating, but the results have not been commercially successful because it has been impossible to cause a layer of adhesive coating of the required thinness to hold ceramic color dust in sufficient quantity or uniformity of distribution. It has also been attempted in the case of colors requiring an unusually heavy deposit to apply successive layers of adhesive coating, each with its own layer of embedded ceramic color, but this has caused blistering during the firing operation resulting from the bubbling of gases from the lower layers through the upper layers.

I have discovered that a single layer of conventional printed adhesive can be caused to retain an entirely adequate depth of ceramic color dust if the dust be worked down into the adhesive coat by comparatively rapid vibration of a brush or analogous applicator surface, and/or of the object or sheet itself.

Transfer sheets and ware bearing the unprecedentedly deep layer of ceramic color dust produced by practice of the present invention result in a finished product having remarkably deep color uniformly distributed and entirely devoid of blisters.

Certain selected embodiments of the invention are illustrated in the accompanying drawings, which depict forms of mechanism that have been found satisfactory in actual operation and which will sufficiently illustrate the broad principles of the invention.

In the drawings,

Figure 1 is a perspective view of a machine for applying ceramic color to transfer mediums of sheet form;

Fig. 2 is an end elevational view of the machine;

Fig. 3 is a transverse section through the machine;

Fig. 4 is a section along line 4—4 of Fig. 2;

Fig. 5 is a section through 5—5 of Fig. 2;

Fig. 6 is a section along 6—6 of Fig. 2;

Fig. 7 is an end elevation, partially broken away and in section, of the drum assembly;

Fig. 8 is a side elevational view of a machine in inoperative position for applying ceramic color direct to ware, and Fig. 9 is a similar view, partially in section, illustrating the machine in operative position.

Referring to the drawings, and first to Figs. 1 and 2, the machine there shown comprises a stationary framework consisting of a pair of annular support members 1 bolted by cap screws or the like 2 to a table bed 3 of convenient height. It will be understood that the annular members 1 are spaced longitudinally apart with centers on a common axis, so that they define a generally cylindrical space between them. Axially through this space is positioned a shaft 4 which is journaled near its opposite ends in bearings 5 mounted on supporting posts 6 which are rigidly secured in the table bed. A drum 7 is fast on the shaft 4 and is rotated thereby. Any suitable pulley, gear or the like, coupled to appropriate power (not shown), may be used to drive the shaft and rotate the drum.

It will be understood that the drum fits between the stationary frame members 1 and is of a diameter somewhat smaller than that of the frame members.

Secured to the frame members 1 in the upper zones thereof is a hopper trough 8 having a bottom opening spaced slightly above the periphery of the drum. A blade-like clamping member 9 extends lengthwise along the drum periphery and is urged downward into the plane of that periphery by some such means as coil springs 10 encircling posts 11 at opposite ends of the drum and reacting between the drum shell and rollers 12 mounted on the inner ends of the posts. These rollers, of course, travel in a circular orbit as the drum rotates. A frame structure 13 is bolted to each of the supporting frames 1 and mounts an arcuate cam track 14 on which each of the rollers 12 rotates during part of its orbital travel. The cam tracks are made circumferentially adjustable with relation to the frames 1 by slotted engagement of the bolts 15 which secure them to the frame structure 13, and each cam track is appropriately profiled to lift the clamping blade 9 radially outwardly during part of each rotation of the drum.

The function of the blade 9 is to receive and clamp the leading edge of a sheet of ceramic color transfer medium onto the drum. This is easily accomplished by slipping such edge of the sheet under the blade when the blade is spaced from the drum periphery, i. e., at a point in the rotation of the drum reached just prior to the position shown in Fig. 2. Immediately thereafter, on rotation of the drum, the roller 12 becomes lowered to the dwell of the cam track 14 and clamps the sheet onto the drum.

The sheet has been previously printed or otherwise treated with suitable adhesive material. It passes under the hopper trough 8 and a liberal quantity of ceramic color is discharged onto it from the hopper. The sheet then passes successively under each of a plurality of brushes or pads 16 which are of elongated form and extend along the drum periphery parallel to the drum axis. These brushes are mounted on stems 17 received in arcuate supports 18 which encircle part of the drum periphery and are concentric with the drum. The opposite ends of the supports 18 are cushion-mounted in upper and lower lengthwise frame members 19 which are secured at their opposite ends to the frame members 1 as by bolts 20.

One suitable form of cushion mounting has been illustrated and comprises an elongated bolt 45 extending through an oversized opening 46 in frame member 19 and thence through a fitted opening 47 in support 18. A dished-out spring washer 48 is seated between the head 49 of the bolt and the outer face of frame member 19. Between the inner face of frame member 19 and the outer face of support 18 are interposed two oppositely disposed spring washers 50 and 51 which, for illustrative purposes, are positioned with the convex surfaces contiguous to one another, the margins of the concave surfaces bearing, respectively, against the inner face of frame member 19 and the outer face of support 18. An additional spring washer 52 may be positioned between the inner face of support 18 and the nut 53, which is taken up on the bolt sufficiently to place the washer under some tension. Thus the supports 18 and the applicator pads or brushes supported thereby are free for limited vibratory movement in all directions with respect to the stationary frame members 19 on which they are thus cushion-mounted.

A tie member 21 spans the supports 18, conveniently at about the midpoint of each, and mounts a vibrator mechanism 22, here shown as of the electrically energized type, employing an unbalanced rotor. Coil springs 23 encircled about the stems 17 react between the supports 18 and the brush elements and resiliently press the brush surfaces toward the drum periphery, and these spring mounts, together with the cushioned connections between the ends of the supports 18 and the lengthwise frame members 19, cause the brush elements to vibrate radially, laterally and longitudinally with relation to the drum when the vibrator element 22 is driven.

An elongated coil spring 24 may be connected under tension between some part of the vibrating assembly and some fixed part of the machine. In Figs. 1-3 such a spring is shown connected between the vibrator bed 21 and a longitudinal frame element 19, while in Fig. 7 such a spring 24' is shown connected between frame 1 near the lower lengthwise frame member 19 and a point 25 on the vibrating assembly near the corresponding upper lengthwise frame member 19.

In use, the vibrator 22 is driven to induce vibrations in the brushes at the rate of not less than 400 per minute, and preferably as high as 7600 per minute. As the sheet of transfer medium moves progressively under the several brushes, with a comparatively thick coating of ceramic color deposited on it from the feed trough 8, the rapidly vibrating brushes function to embed a very considerable quantity of the ceramic color down in the coated areas of the sheet. Color falls from the uncoated, and to some extent also from the coated, areas of the sheet and is collected from beneath the machine for re-use. The plurality of vibrating brushes operate to embed ceramic color into the coated areas to a depth heretofore believed to be impossible of attainment.

The center portion of the table is slotted lengthwise to pass the sheet after it has passed beneath the last brush and after the clamping element 9 becomes lifted from the drum periphery by engagement of the rollers 12 with the rise in the lower portion of the cam track 14. The sheet is deposited in the catcher 26 and is ready, after drying, to be applied in the usual manner to ceramic ware or the like.

While I have shown the vibrator 22 mounted to vibrate the entire cushioned framework and consequently all the brushes, smaller vibrators may be arranged directly on one or more of the individual brushes so as to vibrate such brushes only. In that case the other brushes may be fixed with relation to the stationary frame members 1, so as to transmit more or less vibration.

In Figs. 8 and 9, which constitute the subject matter of my divisional application Serial No. 573,998, the mechanism is designed to apply ceramic color directly to the ware, here shown as a plate or flat dish. As shown in Fig. 8, this device may comprise a stationary frame consisting of four vertical posts 30 upstanding at the corners of an imaginary rectangle from a bed 31 and connected by spaced superposed plates 32 having aligned openings loosely receiving the two or more bars 34 of a movable frame. This movable frame terminates at its bottom in a brush backing 35, mounting a brush 36, and terminates upwardly in a horizontal plate 37 on which is securely mounted a vibrator element 38, here shown as of the electrically energized type.

Upwardly and downwardly projecting pins 39 extend from the lower and upper rigid frame plates 32 respectively and coil springs 40 encircle these pins and react between the plates 32 and a floating equalizer plate 41 fixedly secured to rods 34. A bail or handle 42 is secured to the vibrator bed plate 37, by which the vibrating frame may be elevated as a unit from the ware 43 which in use of the device is positioned on the stationary bed 31 directly below the brush 36. Gravity latches 44 swing from the vibrator bed 37 to the upper stationary plate 32 and hold upper springs 40 compressed and the brush in elevated position whenever the handle 42 is manually pulled to its upper limit, which is done whenever ware 43 is to be inserted beneath the brush or withdrawn therefrom.

As has been made apparent from the foregoing description of the embodiments illustrated in the drawings, the floating or spring suspension of the vibrator and applicator surfaces with reference to the surface on which the color has been deposited obtains relative vibratory movement in all directions between the two surfaces.

The cushion mountings by which the arcuate pad supporting members 18 of Figs. 1-7 and the vibrator itself, are connected to rigid frame members 19 permits limited movement of the pads in all directions with reference to such supporting frames and, of course, with reference to the color deposit. Springs 24, which are secured at one end directly or indirectly to arcuate supports 18 and at the other to some point fixed with reference to main frame 1, supply a constant reaction tendency to movement of the pads imparted by the vibrator in any direction away from those ends of springs 24 which are fixed with reference to the main frame. The pads or brushes themselves are urged constantly toward the deposited color by coil springs 23.

In the embodiment illustrated in Figs. 8 and 9, wherein pad supporting bars 34 are loosely received through openings on spaced main frame plates 32, the play of bars 34 obtained thereby permits movement of the applicator or brush 36 in any direction with reference to the main frame and the ware on which the color has been deposited. When in use the brush 36 is floatingly suspended in contact with the deposited color by means of equalizer springs 40 bearing in opposite directions on equalizer plate 41. These springs provide a reactionary force against the forces of the vibrator imparting movement to the applicator and, together with the play of rods 34 in their bearings, serve to permit vibratory movement of the applicator in all directions with reference to the fixedly positioned ware 43.

In the use of the device illustrated in Figs. 8 and 9 the ware is directly printed or otherwise coated with the bonding medium and a liberal quantity of ceramic color is dusted thereon. The ware is inserted in the device, latches 44 are swung outwardly and the vibrator is set in motion. The brush vibrates at a rate of not less than 400 vibrations per minute and preferably not in excess of 7600, and thus embeds the color material deeply down into the coating on the ware. The ware is then removed from the device, the unattached color is dusted off of it, and the ware is fired in the usual manner.

It will be understood that vibrating elements other than the electric devices herein disclosed by way of exemplification may be used. It is also to be understood that the work to be ornamented may be of any customary shape and character of surface, and that the bonding medium, ceramic color and other materials used in practicing the invention may be any which are well known in the art.

In all mechanical embodiments of the invention, and in the practice of the method, it is immaterial whether the ware or sheet surface to which the color is to be applied be vibrated or be restrained against vibration, it being necessary only that the ware or sheet and the applicator, e. g., the several types of brush disclosed in the illustrative embodiments, be relatively vibrated. Accordingly I contemplate variations of the illustrated mechanisms in which the work will be vibrated and the applicators will be restrained against vibration.

What I claim is:

1. In the method of applying ceramic color to a transfer sheet prepared with an adhesive coating, the steps which comprise depositing ceramic color on the coated surface of said sheet, moving such surface into contact with an applicator surface, and then embedding the color in the coating by vibrating the applicator surface with reference to said sheet at not less than substantially 400 vibrations per minute in all directions.

2. In the methods of applying ceramic color to a transfer sheet prepared with an adhesive coating, the steps which comprise depositing ceramic color on the coated surface of said sheet, moving such surface substantially transversely with reference to an applicator into contact therewith, and then embedding the color in the coating by vibrating the applicator surface with reference to said sheet at not less than substantially 400 vibrations per minute in all directions.

3. In the method of applying ceramic color to a transfer sheet prepared with an adhesive coating, the steps which comprise depositing ceramic color on the coated surface of said sheet, moving such surface in an arcuate path into contact with an applicator, and then embedding the color in the coating by vibrating the applicator with reference to said sheet at not less than substantially 400 vibrations per minute in all directions.

4. That method of applying ceramic color to a transfer sheet prepared with an adhesive coating which comprises the steps of securing said sheet upon a supporting surface, depositing ceramic color on the coated portion of said sheet, moving the supporting surface to bring the coated portion of said sheet in contact with an applicator, then embedding the color in the coating by vibrating the applicator with reference to the coated surface at not less than substantially 400 vibrations per minute in all directions, and moving said supporting surface to separate it from said applicator.

5. That method of applying ceramic color to a transfer sheet prepared with an adhesive coating which comprises the steps of securing said sheet upon a supporting surface, depositing ceramic color on the coated portion of said sheet, moving the supporting surface to bring the coated portion of said sheet in contact with an applicator, then embedding the color in the coating by vibrating the applicator with reference to the coated surface during continued movement of the latter at not less than substantially 400 vibrations per minute in all directions, and moving said supporting surface to separate it from said applicator.

6. That method of applying ceramic color to a transfer sheet prepared with an adhesive coating which comprises the steps of securing said sheet upon a supporting surface, depositing ceramic color on the coated portion of said sheet, moving the supporting surface in an arcuate path transversely past a series of applicators, then embedding the color in the coated portion of said sheet during continued movement of the latter by vibrating at least one applicator of said series at not less than substantially 400 vibrations per minute in all directions, and continuing movement of said supporting surface to separate it from said applicator while removing the excess of deposited color from the sheet.

EUGENE HARDESTY.